(12) United States Patent
Osawa et al.

(10) Patent No.: US 8,205,724 B2
(45) Date of Patent: Jun. 26, 2012

(54) DISC BRAKE DEVICE

(75) Inventors: Yoshihiro Osawa, Numazu (JP); Hiroshi Isono, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 856 days.

(21) Appl. No.: 12/299,025

(22) PCT Filed: Jan. 25, 2008

(86) PCT No.: PCT/JP2008/051601
§ 371 (c)(1),
(2), (4) Date: Oct. 30, 2008

(87) PCT Pub. No.: WO2008/091025
PCT Pub. Date: Jul. 31, 2008

(65) Prior Publication Data
US 2010/0000827 A1    Jan. 7, 2010

(30) Foreign Application Priority Data
Jan. 26, 2007   (JP) .................................. 2007-016661

(51) Int. Cl.
*F16D 55/18* (2006.01)
(52) U.S. Cl. .................................. 188/72.4; 188/196 A
(58) Field of Classification Search .................. 188/72.4, 188/72.1, 72.5, 73.1, 196 A, 106 P
See application file for complete search history.

(56) References Cited

U.S. PATENT DOCUMENTS

| 3,890,884 A | 6/1975 | Silberschlag |
| 4,055,238 A | 10/1977 | Haraikawa et al. |
| 4,412,603 A * | 11/1983 | Bischoff .................. 188/106 P |
| 4,496,033 A | 1/1985 | Hall et al. |
| 5,485,902 A * | 1/1996 | Berwanger .............. 188/196 A |

FOREIGN PATENT DOCUMENTS

| DE | 2 047 634 | 4/1971 |
| DE | 41 40 279 C1 | 12/1991 |
| DE | 102 36 686 A1 | 2/2004 |
| JP | 7 259900 | 10/1995 |
| JP | 8 159191 | 6/1996 |

(Continued)

OTHER PUBLICATIONS

Office Action issued May 6, 2011, in German Patent Application No. 11 2008 000 216.9-12.

(Continued)

*Primary Examiner* — Melanie Torres Williams
(74) *Attorney, Agent, or Firm* — Oblon, Spivak, McClelland, Maier & Neustadt, L.L.P.

(57) ABSTRACT

A disk brake apparatus that can suppress vibration and a brake noise phenomenon in a low deceleration range and increase braking force in a high deceleration range. In the low deceleration range a push surface at a tip of a small-diameter push portion of an inner piston pushes a back plate of a brake pad at a center of the push surface corresponding to a radial inside where deflection and inclination of a disk rotor is insignificant, thereby suppressing the vibration and brake noise phenomenon in the low deceleration range. In the high deceleration range the back plate of the brake pad is pushed at a radially outside push location of the disk rotor in an aperture-side end face of an outer piston, thereby making the braking force in the high deceleration range larger than the braking force in the low deceleration range.

9 Claims, 11 Drawing Sheets

FOREIGN PATENT DOCUMENTS

| | | |
|---|---|---|
| JP | 8 270691 | 10/1996 |
| JP | 9 280280 | 10/1997 |
| JP | 10 288230 | 10/1998 |
| JP | 2001 227572 | 8/2001 |
| JP | 2006 71078 | 3/2006 |
| JP | 2008-71078 | 3/2008 |

OTHER PUBLICATIONS

Japanese Notice of Allowance issued Nov. 16, 2010, in Patent Application No. 2007-016661.

* cited by examiner

# DISC BRAKE DEVICE

TECHNICAL FIELD

The present invention relates to a disk brake apparatus mounted as a braking device on a vehicle.

BACKGROUND ART

A disk brake apparatus mounted on a vehicle is generally so arranged that brake pads opposed to two faces of a disk rotor are pushed against the two faces of the disk rotor by a caliper piston fitted in a caliper cylinder. This disk brake apparatus varies its braking force according to a brake fluid pressure supplied to the caliper cylinder.

Proposed as the disk brake apparatus of this type is one so arranged that the push position of the brake pads by the caliper piston is set at a radially outside location of the disk rotor to improve braking performance (e.g., cf. Japanese Patent Application Laid-open No. 9-280280).

DISCLOSURE OF THE INVENTION

Incidentally, since the disk brake apparatus described in the Patent Document 1 is arranged to push the brake pads at the radially outside location where deflection and inclination of the disk rotor is significant, vibration and a brake noise phenomenon occur easily in a low deceleration range in which the brake fluid pressure supplied to the caliper cylinder is low.

In fact, the vibration and brake noise phenomenon can be suppressed by setting the push position of the brake pads by the caliper piston at a radially inward location of the disk rotor, but in this case the braking force is lowered in a high deceleration range in which the brake fluid pressure supplied to the caliper cylinder is high. Namely, with the conventional disk brake apparatus, it is difficult to achieve both of suppression of the vibration and the brake noise phenomenon in the low deceleration range and increase in the braking force in the high deceleration range.

It is therefore an object of the present invention to provide a disk brake apparatus capable of achieving both of the suppression of the vibration and brake noise phenomenon in the low deceleration range and the increase in the braking force in the high deceleration range.

A disk brake apparatus according to the present invention is a disk brake apparatus for pushing a brake pad against a disk rotor by a caliper piston in accordance with a brake fluid pressure supplied to a caliper cylinder, to obtain a braking force, wherein the caliper piston comprises a first piston for pushing the brake pad in a low deceleration range where the brake fluid pressure is low, and a second piston for pushing the brake pad in a high deceleration range where the brake fluid pressure is high, and wherein the second piston is configured to push the brake pad at a radially outside push location of the disk rotor with respect to a center of a push surface of the first piston.

In the disk brake apparatus according to the present invention, the first piston pushes the brake pad at the center of the push surface corresponding to the radial inside where deflection and inclination of the disk rotor is insignificant, in the low deceleration range, which suppresses the vibration and brake noise phenomenon in the low deceleration range. On the other hand, the second piston pushes the brake pad at the radially outside push location of the disk rotor with respect to the center of the push surface of the first piston in the high deceleration range, which makes the braking force in the high deceleration range larger than the braking force in the low deceleration range.

The disk brake apparatus of the present invention can be so configured that at a predetermined brake fluid pressure the second piston undergoes relative movement toward the disk rotor with respect to the first piston to push the brake pad. In this case, a changeover is made according to the brake fluid pressure supplied to the caliper cylinder, between the low deceleration range where the first piston pushes the brake pad and the high deceleration range where the second piston pushes the brake pad.

The disk brake apparatus of the present invention can have a structure wherein the second piston is fitted in the caliper cylinder, wherein the first piston is fitted in a relatively movable state in the second piston, and wherein a biasing member for biasing the first piston toward the disk rotor with respect to the second piston is disposed between the first piston and the second piston.

In this case, a changeover is made according to the brake fluid pressure supplied to the caliper cylinder and a biasing force of the biasing member, between the low deceleration range where the first piston pushes the brake pad and the high deceleration range where the second piston pushes the brake pad, and thus the changeover can be changed by a setting value of the biasing force of the biasing member. The second piston can be compactly housed together with the first piston in the caliper cylinder, without design change of the caliper cylinder.

In the disk brake apparatus of the present invention a sectional shape of the second piston is preferably an elliptical or oblong shape elongated in a circumferential direction of the disk rotor because rotation of the second piston is restricted thereby to stabilize the position of the push portion to push the brake pad.

Furthermore, the center of the push surface of the first piston is preferably set with a deviation to a radial inward of the disk rotor with respect to a center of a push surface of the second piston because the first piston surely pushes the brake pad to the radial inward of the disk rotor.

BEST MODE FOR CARRYING OUT THE INVENTION

Figure 1:
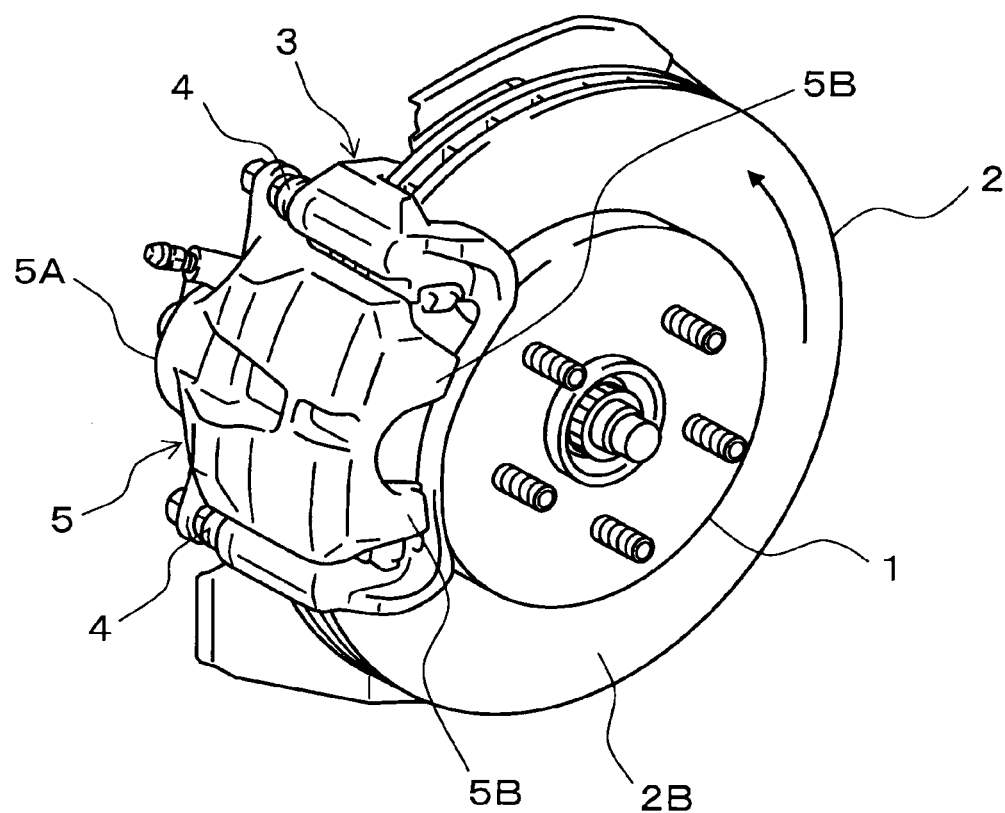
FIG. 1 is a perspective view showing appearance of a disk brake apparatus according to an embodiment of the present invention.

The best mode of embodiment of the disk brake apparatus according to the present invention will be described below with reference to the drawings. In the drawings to be referred to, FIG. 1 is a perspective view showing the appearance of the disk brake apparatus according to an embodiment of the present invention, FIG. 2 a partial sectional view schematically showing a sectional structure of a caliper in the disk brake apparatus shown in FIG. 1, and FIG. 3 an enlarged sectional view of a caliper piston shown in FIG. 2.

The disk brake apparatus of the embodiment is mounted as a braking device on an unrepresented vehicle. This disk brake apparatus, for example as shown in FIG. 1, has a disk rotor 2 fixed to a hub 1 of an axle and arranged to rotate together therewith, a mounting (torque member) 3 supported, for example, by suspension parts of a vehicle body not shown and arranged across the peripheral part of the disk rotor 2, and a caliper 5 of a floating type mounted on the mounting 3 so as to be slidable in parallel with a rotational axis of the disk rotor 2 through a pair of slide pins 4, 4.

Figure 2:
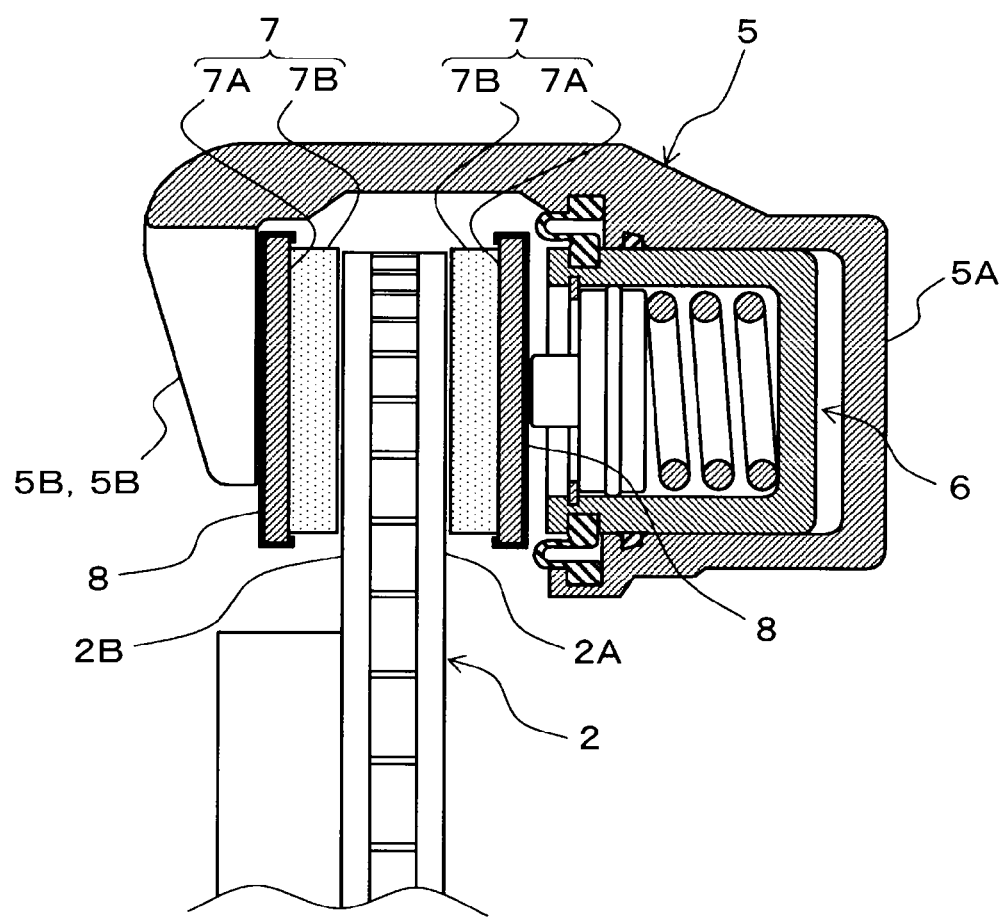
FIG. 2 is a partial sectional view schematically showing a sectional structure of a caliper in the disk brake apparatus shown in FIG. 1.

As shown in FIG. 2, the caliper 5 of a bridge structure arranged across the peripheral part of the disk rotor 2 has a caliper cylinder 5A facing an inside rotor surface 2A formed in the peripheral part of the disk rotor 2, and a pair of claws 5B, 5B (cf. FIG. 1) facing an outside rotor surface 2B, and a caliper piston 6 is fitted in the caliper cylinder 5A. This caliper piston 6 is arranged to telescopically move in parallel with the rotational axis of the disk rotor 2, according to a brake fluid pressure supplied into the caliper cylinder 5A through a brake pipe of the vehicle not shown.

A brake pad 7 is located between the caliper piston 6 fitted in the caliper cylinder 5A and the inside rotor surface 2A of the disk rotor 2 and a similar brake pad 7 is also located between the claws 5B, 5B of the caliper 5 and the outside rotor surface 2B of the disk rotor 2.

The brake pads 7, 7 have a structure in which a pad member 7B, 7B is bonded to a back plate 7A, 7A, and one brake pad 7 is so arranged that the back plate 7A faces the caliper piston 6 and that the pad member 7B faces the inside rotor surface 2A of the disk rotor 2. The other brake pad 7 is so arranged that the back plate 7A faces the claws 5B, 5B of the caliper 5 and that the pad member 7B faces the outside rotor surface 2B of the disk rotor 2.

In order to suppress high-frequency vibration generated by the brake pads 7, 7 during braking to prevent the so-called brake noise, a pad shim 8 facing the caliper piston 6 is attached to the back plate 7A of the brake pad 7, and a pad shim 8 facing the claws 5B, 5B of the caliper 5 is attached to the back plate 7A of the other brake pad 7.

Figure 3:
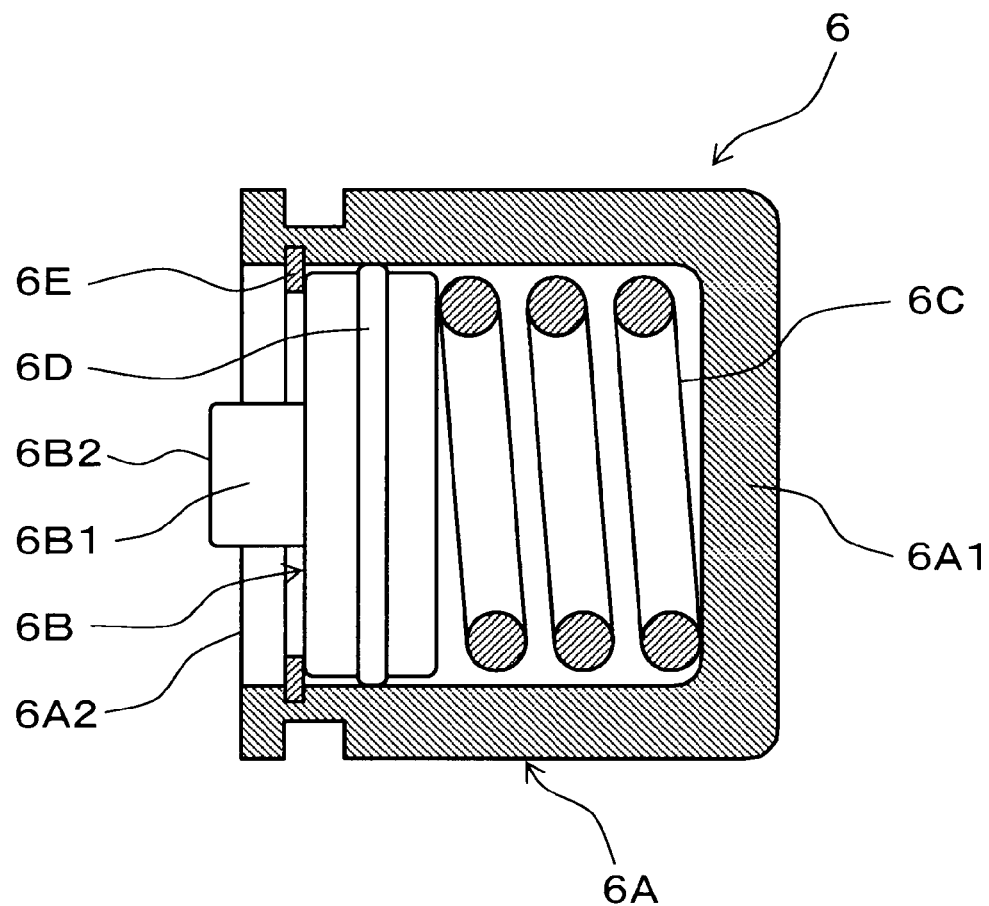
FIG. 3 is an enlarged sectional view showing a structure of a caliper piston shown in FIG. 2.

As shown in FIG. 3, the caliper piston 6 is constructed with a cup-shaped outer piston (second piston) 6A slidably fitted in the caliper cylinder 5A (cf. FIG. 2) into which the brake fluid pressure is supplied, an inner piston (first piston) 6B slidably fitted in this outer piston 6A, and a coil spring (biasing member) 6C interposed between the inner piston 6B and a bottom portion 6A1 of the cup-shaped outer piston 6A.

The inner piston 6B as the first piston has a structure in which a small-diameter push portion 6B1 is projecting in a central region of one end face facing an aperture of the outer piston 6A. The periphery of this inner piston 6B is equipped with a teflon ring (teflon is a registered trademark) 6D arranged to slide on an inner periphery surface of the outer piston 6A. This inner piston 6B is engaged with a stopper ring 6E such as a C-ring mounted near the aperture of the inner periphery surface of the outer piston 6A, and in this state a push surface 6B2 at the tip of the small-diameter push portion 6B1 is projecting by a predetermined amount from an aperture-side end face 6A2 of the outer piston 6A.

When the brake fluid pressure acts on the bottom portion 6A1 of the outer piston 6A, the coil spring 6C as the biasing member is compressed as pushed by the bottom portion 6A1 of the outer piston 6A to effect relative movement of the outer piston 6A toward the brake pad 7 with respect to the inner piston 6B. The spring constant of this coil spring 6C is set as follows: for example, when a border deceleration is set as 0.4 G between the low deceleration range and the high deceleration range of the unrepresented vehicle, the coil spring 6C is compressed until the aperture-side end face 6A2 of the outer piston 6A becomes flush with the push surface 6B2 of the small-diameter push portion 6B1 of the inner piston 6B, with the brake fluid pressure of about 4 Mpa corresponding to the deceleration of 0.4 G, acting on the bottom portion 6A1 of the outer piston 6A.

In the disk brake apparatus of the embodiment constructed as described above, when a braking operation is activated by a brake pedal of the unrepresented vehicle, the brake fluid pressure according to the step-on operation of the brake pedal is supplied to the caliper cylinder 5A shown in FIG. 2. Then this brake fluid pressure causes the caliper piston 6 to push the back plate 7A of one brake pad 7 and its reaction force causes the claws 5B, 5B of the caliper 5 to push the back plate 7A of the other brake pad 7. This results in bringing the pad members 7B, 7B of the pair of brake pads 7, 7 into friction contact with the inside rotor surface 2A and the outside rotor surface 2B of the disk rotor 2 to yield a braking force.

Figure 4:
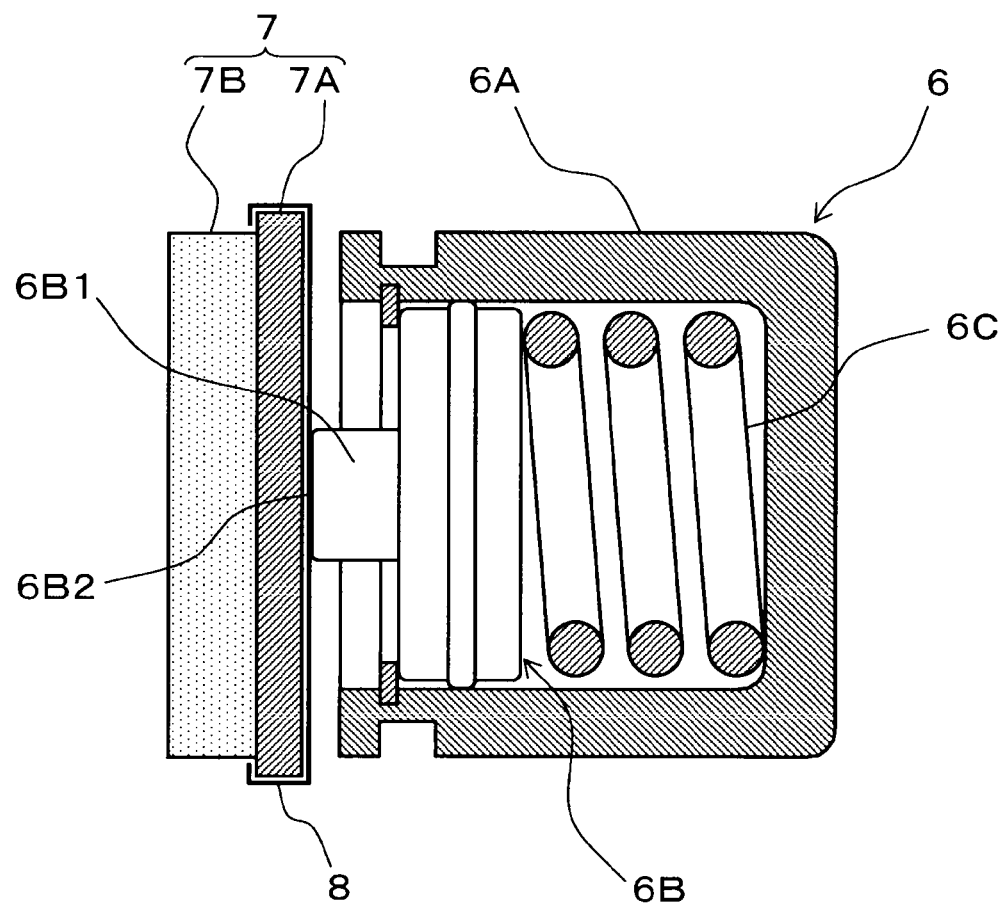
FIG. 4 is an enlarged sectional view showing an operation in a low deceleration range of the caliper piston shown in FIG. 3.

In a case where the brake fluid pressure supplied to the caliper cylinder 5A is not more than 4 MPa corresponding to the vehicle deceleration of 0.4 G, i.e., in the low deceleration range of the vehicle, as shown in FIG. 4, the push surface 6B2 at the tip of the small-diameter push portion 6B1 of the inner piston (first piston) 6B forming the caliper piston 6 pushes the back plate 7A of one brake pad 7.

The center of the push by the push surface 6B2 of the inner piston 6B is located near the centroid which resides radially inward the disk rotor 2 with respect to the periphery side of the brake pad 7, and surface deflection and inclination of the inside rotor surface 2A and the outside rotor surface 2B of the disk rotor 2 is less significant near the centroid of the brake pad 7 than on the periphery side, which suppresses the vibration and brake noise phenomenon of the brake pad 7.

Figure 5:
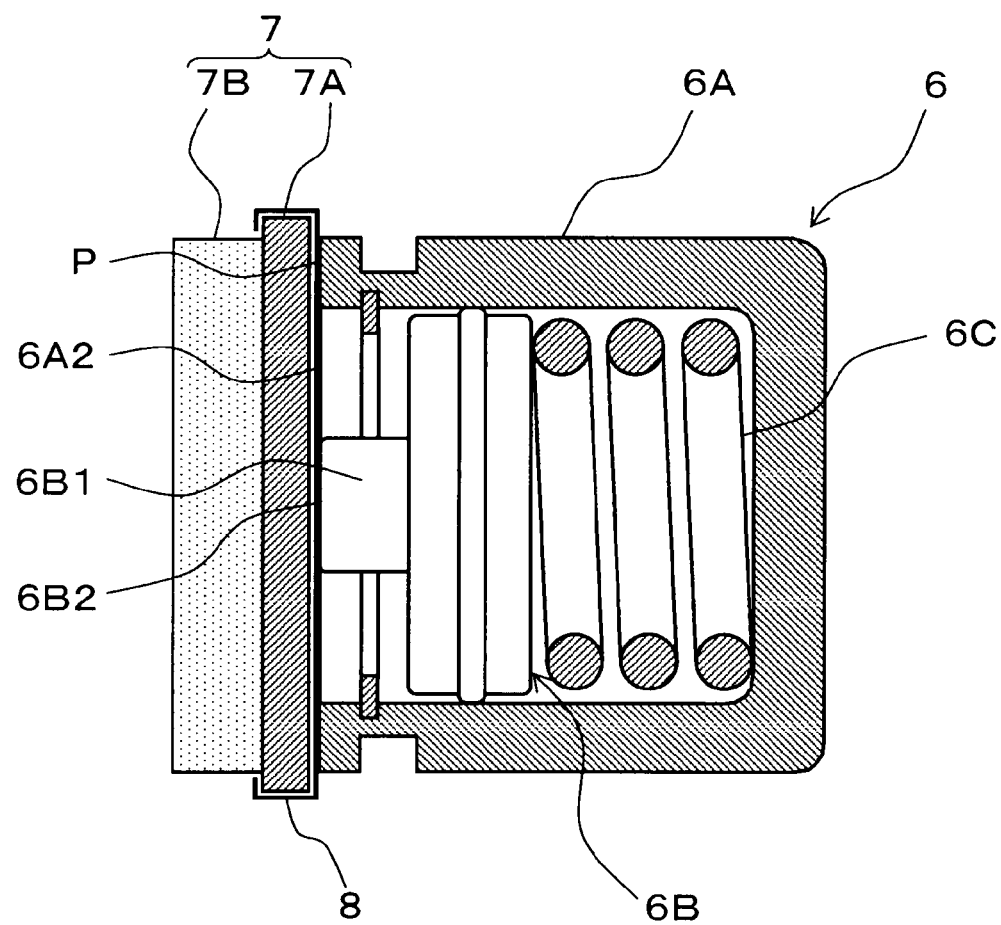
FIG. 5 is an enlarged sectional view showing an operation in a high deceleration range of the caliper piston shown in FIG. 3.

On the other hand, in a case where the brake fluid pressure supplied to the caliper cylinder 5A is over 4 Mpa corresponding to the vehicle deceleration of 0.4 G, i.e., in the high deceleration range of the vehicle, as shown in FIG. 5, the coil spring 6C (biasing member) is compressed until the aperture-side end face 6A2 of the outer piston (second piston) 6A forming the caliper piston 6 becomes flush with the push surface 6B2 of the small-diameter push portion 6B1 of the inner piston 6B; therefore, the aperture-side end face 6A2 of the outer piston 6A pushes the back plate 7A of one brake pad 7.

On that occasion, a reaction force of the high brake fluid pressure over 4 Mpa in the caliper cylinder 5A shown in FIG. 2 deflects the caliper 5 of the bridge structure so as to increase the spacing between the caliper cylinder 5A and the claws 5B, 5B, whereby the aperture-side end face 6A2 of the outer piston 6A pushes the periphery side of the brake pad 7 at a radially outside location P of the disk rotor 2. As a result, the braking force in the high deceleration range becomes larger than the braking force in the low deceleration range.

Therefore, the disk brake apparatus of the embodiment is able to achieve both the suppression of the vibration and the brake noise phenomenon in the low deceleration range where the brake fluid pressure supplied to the caliper cylinder 5A is, for example, not more than 4 Mpa, and the increase in the braking force in the high deceleration range where the brake fluid pressure is, for example, over 4 Mpa.

Since the disk brake apparatus of the embodiment is arranged to make a changeover according to the brake fluid pressure supplied to the caliper cylinder 5A and the spring constant of the coil spring (biasing member) 6C between the low deceleration range where the inner piston (first piston) 6B pushes the brake pad 7 and the high deceleration range where the outer piston (second piston) 6A pushes the brake pad 7, a point of the changeover can be readily and accurately changed according to a setting value of the low spring constant of the coil spring 6C.

Furthermore, without design change of the caliper cylinder 5A, the outer piston (second piston) 6A can be compactly housed together with the inner piston (first piston) 6B in the caliper cylinder 5A.

Figure 6:
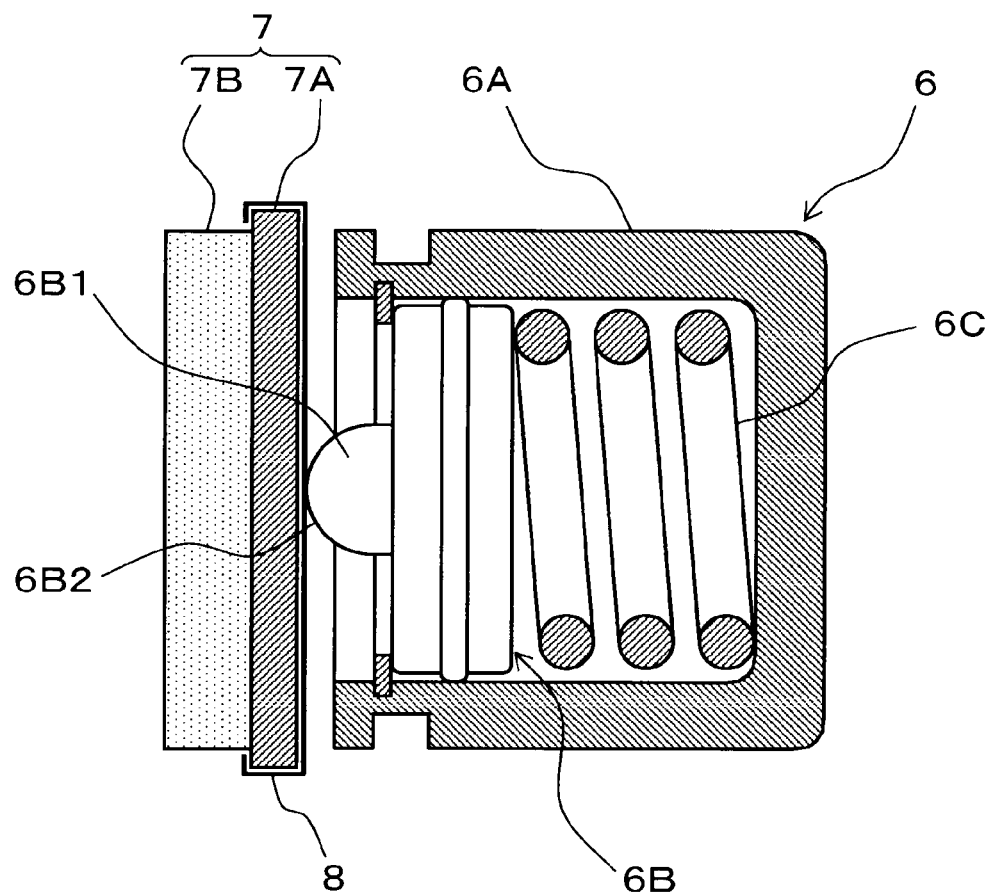
FIG. 6 is an enlarged sectional view corresponding to FIG. 4, which shows a modification example of the caliper piston shown in FIG. 3.

The disk brake apparatus according to the present invention is not limited to the above-described embodiment but can be optionally modified in the structure of the major part thereof. For example, the caliper piston 6 shown in FIG. 3 may be modified, as shown in FIG. 6, in such a manner that the push surface 6B2 at the tip of the push portion 6B1 of the inner piston (first piston) 6B is a curved surface. In this case, since the push surface 6B2 comes into point contact with the back plate 7A of the brake pad 7, the inner piston 6B becomes unlikely to be affected by surface deflection of the inside rotor surface 2A and the outside rotor surface 2B of the disk rotor 2, which decreases the so-called drag phenomenon in the low deceleration range, so as to suppress the brake vibration and improve fuel consumption of the vehicle.

Figure 7:
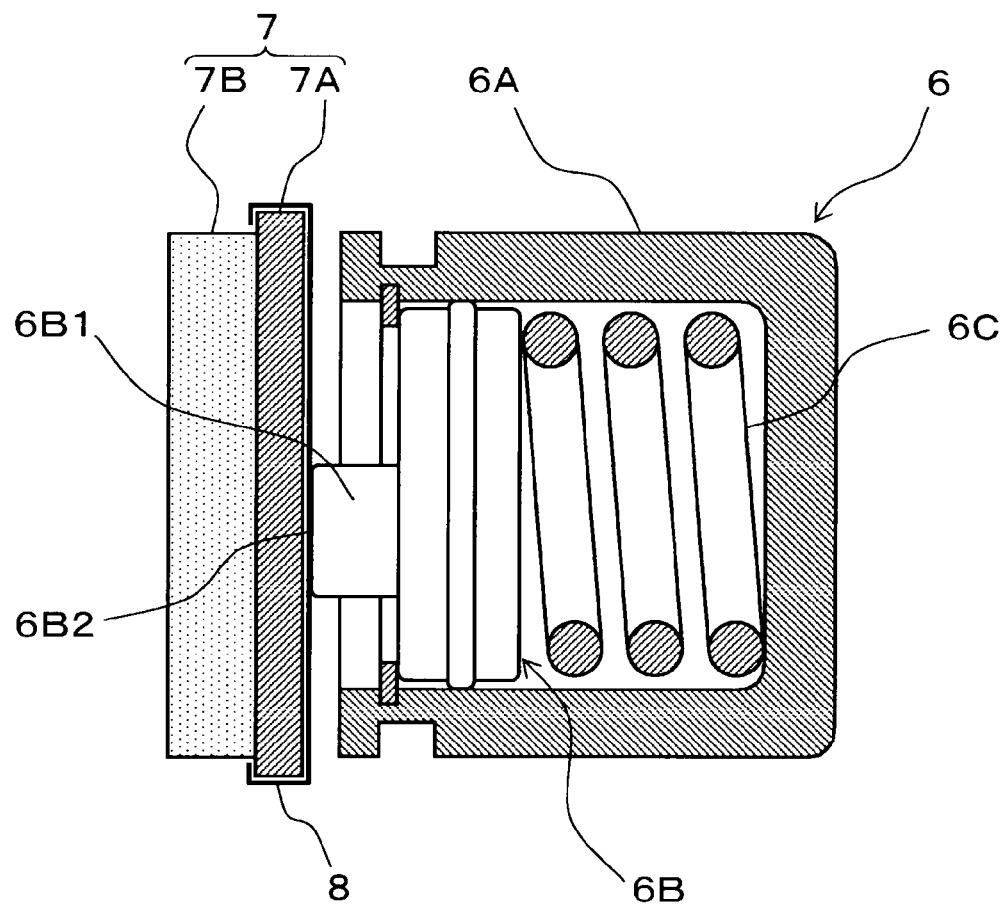
FIG. 7 is an enlarged sectional view corresponding to FIG. 4, which shows another modification example of the caliper piston shown in FIG. 3.
Figure 8:
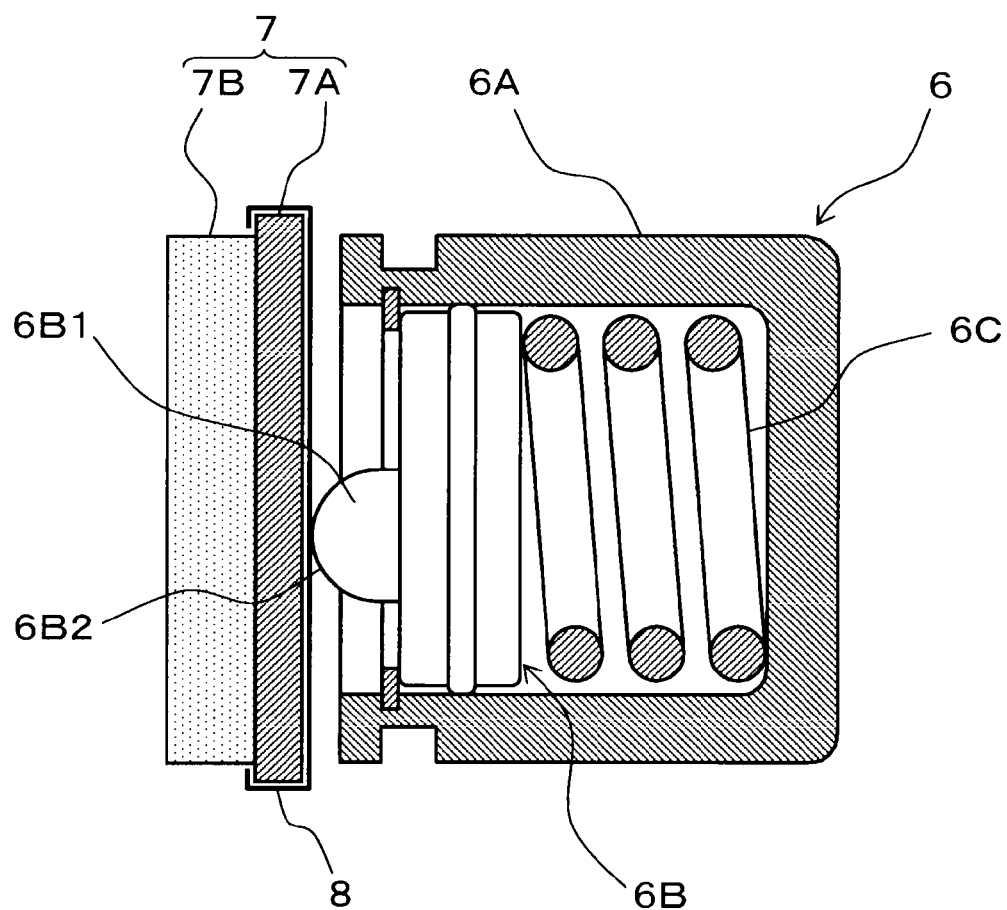
FIG. 8 is an enlarged sectional view showing a modification example of the caliper piston shown in FIG. 6.

The caliper pistons 6 shown in FIG. 3 and FIG. 6 may be modified, as shown in FIG. 7 and FIG. 8 corresponding thereto, so that the push portion 6B1 of the inner piston (first piston) 6B is deviated to a position nearer the inner periphery side of the brake pad 7. In this case, the center of the push by the push surface 6B2 of the push portion 6B1 is shifted to the inner periphery side of the brake pad 7, whereby the vibration and brake noise phenomenon can be more effectively suppressed in the low deceleration range.

Figure 9:
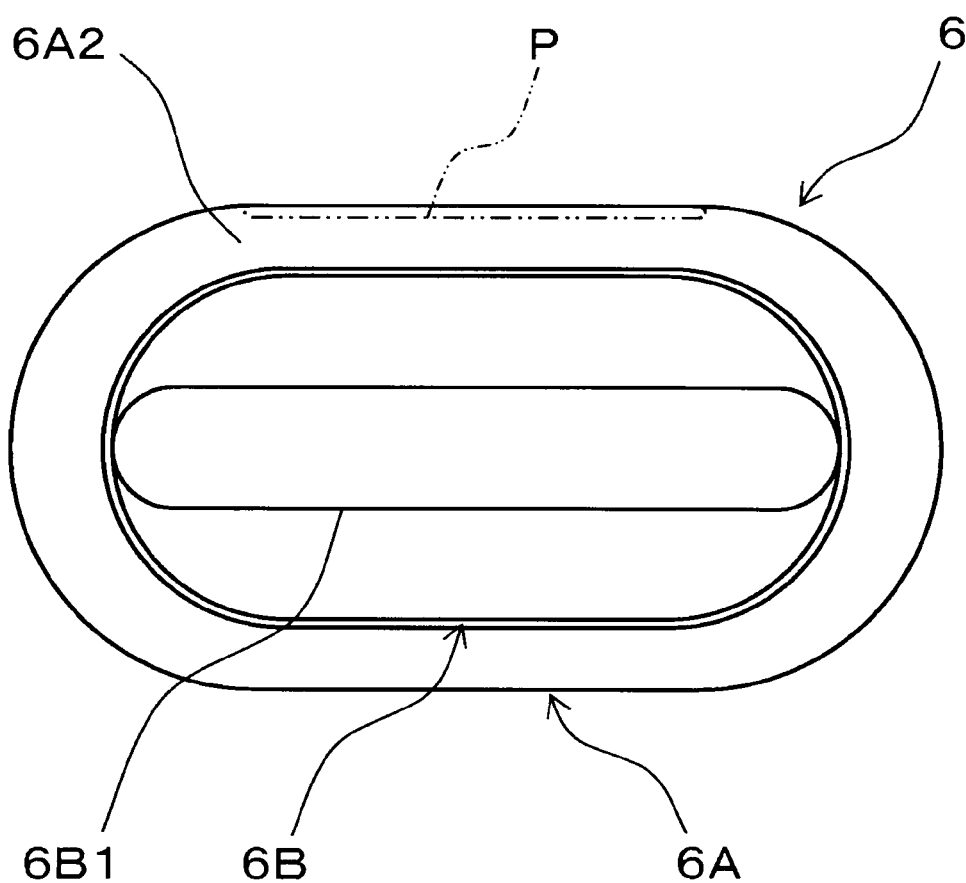
FIG. 9 is a front view showing another modification example of the caliper pistons shown in FIG. 3 and FIG. 6.

Furthermore, each of vertical sectional shapes of the outer piston (second piston) 6A and the inner piston (first piston) 6B of the caliper pistons 6 shown in FIG. 3 and FIG. 6 may be an oblong or elliptical shape (not shown) elongated in the circumferential direction of the disk rotor 2 as shown in the front view of FIG. 9. The caliper pistons 6 shown in FIG. 7 and FIG. 8 can also be similarly constructed though not shown.

In the case of the modification example shown in FIG. 9, circumferential rotation of each of the outer piston 6A and the inner piston 6B is restricted, and thus the surface pressure on the brake pad 7 by them becomes stabilized. Since the radially outside location P of the disk rotor 2 in the aperture-side end face 6A2 of the outer piston 6A is extended along the circumferential direction of the disk rotor 2, the braking force in the high deceleration range becomes more stably larger than the braking force in the low deceleration range.

The aperture-side end face 6A2 of the outer piston 6A shown in FIG. 3, FIG. 6, FIG. 7, or FIG. 8 may be arranged as inclined so that the portion facing the periphery side of the brake pad 7 (the radially outside location P of the disk rotor 2) is projecting slightly (0.2 mm or less). In this case, the projecting portion reliably pushes the periphery side of the brake pad 7 when the aperture-side end face 6A2 of the outer piston 6A pushes the brake pad 7 in the high deceleration range; therefore, the braking force can be securely increased.

Figure 10:
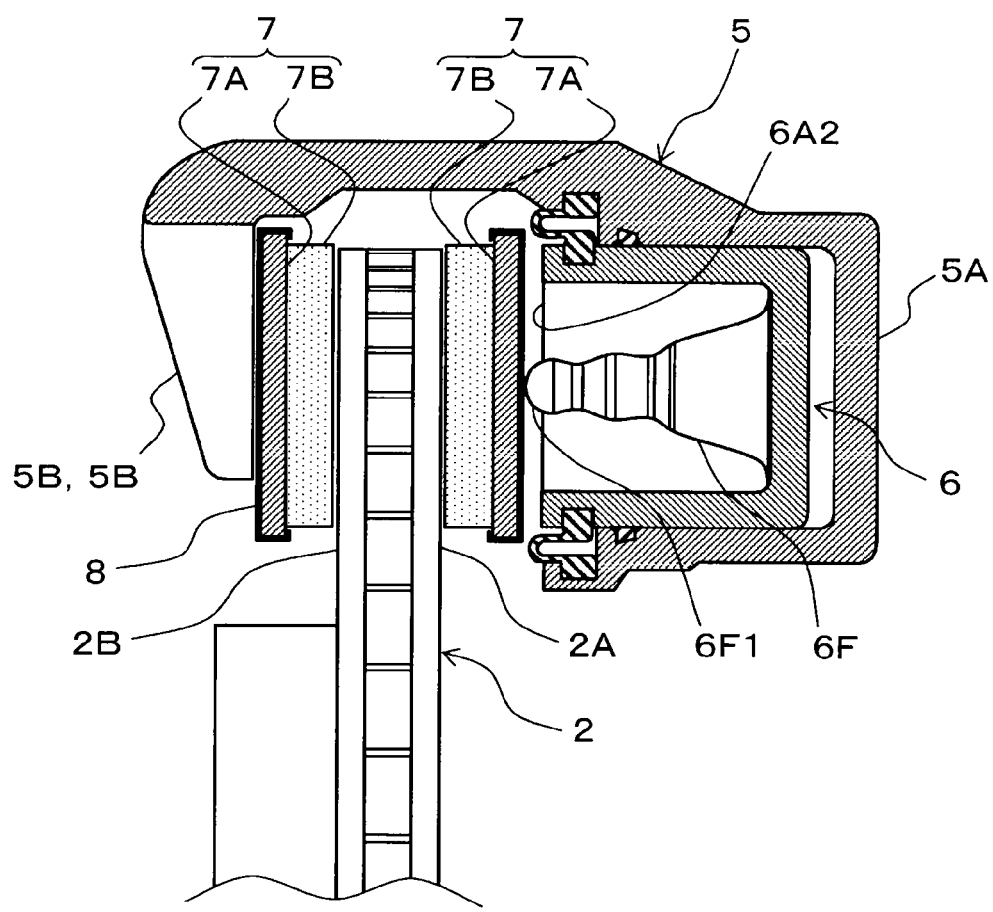
FIG. 10 is a partial sectional view corresponding to FIG. 2, which shows still another modification example of the caliper piston shown in FIG. 2.

The caliper piston 6 shown in FIG. 2 may be modified so as to have a structure as shown in FIG. 10. This caliper piston 6 has the structure in which a cylindrical spring member 6F of a cylindrical shape with a large stroke having the functions of the aforementioned inner piston (first piston) 6B and the coil spring (biasing member) 6C is located in the outer piston 6A. This cylindrical spring member 6F is formed so that a compressively deformable head 6F1 is projecting by a predetermined amount from the aperture-side end face 6A2 of the outer piston 6A.

In the disk brake apparatus with the caliper piston 6 shown in FIG. 10, the head 6F1 of the cylindrical spring member 6F pushes the portion of one brake pad 7 near the centroid thereof in the low deceleration range of the vehicle. In the high deceleration range of the vehicle, the head 6F1 of the cylindrical spring member 6F is compressively deformed to bring the aperture-side end face 6A2 of the outer piston 6A into contact with the one brake pad 7. Therefore, the disk brake apparatus with the caliper piston 6 shown in FIG. 10 is also able to achieve the same operational effect as the disk brake apparatus of the embodiment.

Figure 11:
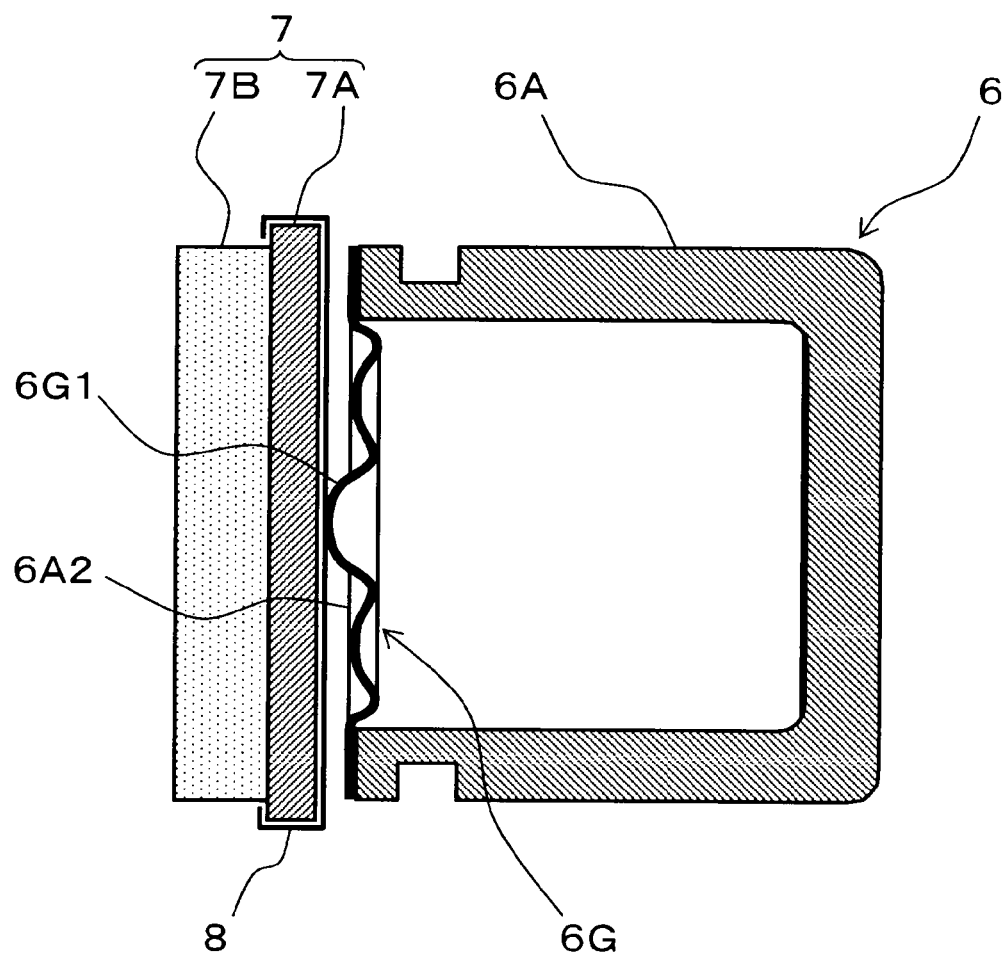
FIG. 11 is an enlarged sectional view showing a modification example of the caliper piston shown in FIG. 10.

The caliper piston 6 shown in FIG. 10 may be modified in a structure as shown in FIG. 11. This caliper piston 6 is constructed so that a disk spring member 6G, instead of the spring member 6F shown in FIG. 10, is fixed to the aperture of the outer piston 6A. This disk spring member 6G is so arranged that a compressively deformable head 6G1 formed in the central region is projecting by a predetermined amount from the aperture-side end face 6A2 of the outer piston 6A.

In the disk brake apparatus with the caliper piston 6 shown in FIG. 11, the head 6G1 of the disk spring member 6G pushes the portion of one brake pad 7 near the centroid thereof in the low deceleration range of the vehicle. In the high deceleration range of the vehicle, the head 6G1 of the disk spring member 6G is compressively deformed to bring the aperture-side end face 6A2 of the outer piston 6A into contact with the one brake pad 7. Therefore, the disk brake apparatus with the caliper piston 6 shown in FIG. 11 is also able to achieve the same operational effect as the disk brake apparatus of the embodiment.

Although not shown, the claws 5B, 5B of the caliper 5 shown in FIG. 10 may be modified as follows: each claw is provided with a recess facing the back plate 7A of the other brake pad 7 and a cylindrical spring member similar to the cylindrical spring member 6F is similarly placed in this recess. In this case, the heads of the cylindrical spring members projecting from the recesses of the claws 5B, 5B push the portion of the other brake pad 7 near the centroid thereof in the low deceleration range of the vehicle. In the high deceleration range of the vehicle, the heads of the cylindrical spring members are compressively deformed to bring the claws 5B, 5B into contact with the other brake pad 7.

Although not shown, it is also possible to fix a disk spring member similar to the disk spring member 6G shown in FIG. 11, to an aperture of each of the recesses formed in the claws 5B, 5B as described above. In this case, the heads of the disk spring members push the portion of the other brake pad 7 near the centroid thereof in the low deceleration range of the vehicle. In the high deceleration range of the vehicle, the heads of the disk spring members are compressively deformed to bring the claws 5B, 5B into contact with the other brake pad 7.

INDUSTRIAL APPLICABILITY

Since the disk brake apparatus according to the present invention is so arranged that in the low deceleration range the first piston pushes the brake pad at the center of the push surface corresponding to the radial inside where the deflection and inclination of the disk rotor is insignificant and that in the high deceleration range the second piston pushes the brake pad at the radially outside push location of the disk rotor with respect to the center of the push surface of the first piston, it is able to achieve both the suppression of the vibration and brake noise phenomenon in the low deceleration range and the increase in the braking force in the high deceleration range.

The invention claimed is:

1. A disk brake apparatus for pushing a brake pad against a disk rotor by a caliper piston in accordance with a brake fluid pressure supplied to a caliper cylinder, to yield a braking force,
   wherein said caliper piston comprises a first piston for pushing the brake pad in a low deceleration range where the brake fluid pressure is low, and a second piston for pushing the brake pad in a high deceleration range where the brake fluid pressure is high,
   wherein the second piston is configured to push the brake pad at a radially outside push location of the disk rotor with respect to a center of a push surface of the first piston, and
   wherein the first piston has a structure in which a small-diameter push portion is projecting in a central region of one end face facing an aperture of the second piston.

2. The disk brake apparatus according to claim 1, wherein at a predetermined brake fluid pressure the second piston undergoes relative movement toward the disk rotor with respect to the first piston to push the brake pad.

3. The disk brake apparatus according to claim 2, wherein the second piston is fitted in the caliper cylinder, wherein the first piston is fitted in a relatively movable state in the second piston, and wherein a biasing member for biasing the first piston toward the disk rotor with respect to the second piston is disposed between the first piston and the second piston.

4. The disk brake apparatus according to claim 3, wherein a sectional shape of the second piston is an elliptical or oblong shape elongated in a circumferential direction of the disk rotor.

5. The disk brake apparatus according to claim 1, wherein the center of the push surface of the first piston is set with a deviation to a radial inward of the disk rotor with respect to a center of a push surface of the second piston.

6. The disk brake apparatus according to claim 2, wherein the center of the push surface of the first piston is set with a deviation to a radial inward of the disk rotor with respect to a center of a push surface of the second piston.

7. The disk brake apparatus according to claim 3, wherein the center of the push surface of the first piston is set with a deviation to a radial inward of the disk rotor with respect to a center of a push surface of the second piston.

8. The disk brake apparatus according to claim 4, wherein the center of the push surface of the first piston is set with a deviation to a radial inward of the disk rotor with respect to a center of a push surface of the second piston.

9. The disk brake apparatus according to claim 1, wherein, in the high deceleration range, the push surface of the first piston is flush with a push surface of the second piston.

* * * * *